(12) United States Patent
Barnes

(10) Patent No.: US 6,813,179 B2
(45) Date of Patent: Nov. 2, 2004

(54) CACHE MEMORY

(75) Inventor: William Bryan Barnes, Bristol (GB)

(73) Assignee: STMicroelectronics Limited, Bristol (GB)

(*) Notice: Subject to any disclaimer, the term of this patent is extended or adjusted under 35 U.S.C. 154(b) by 0 days.

(21) Appl. No.: 10/130,174

(22) PCT Filed: Sep. 11, 2001

(86) PCT No.: PCT/GB01/04080

§ 371 (c)(1),
(2), (4) Date: Nov. 17, 2002

(87) PCT Pub. No.: WO02/23347

PCT Pub. Date: Mar. 21, 2002

(65) Prior Publication Data

US 2003/0142537 A1 Jul. 31, 2003

(30) Foreign Application Priority Data

Sep. 12, 2000 (GB) .............................. 00222323
Oct. 6, 2000 (GB) .............................. 0024541

(51) Int. Cl.[7] .............................. G11C 11/00
(52) U.S. Cl. .................... 365/154; 365/154; 365/188
(58) Field of Search ................. 365/154, 49, 189.02, 365/200, 230.02, 230.08, 51; 711/146, 147

(56) References Cited

U.S. PATENT DOCUMENTS 5,253,203 A 10/1993 Partovi et al. ......... 365/189.02
5,339,399 A * 8/1994 Lee et al. ................. 711/146
6,378,050 B1 * 4/2002 Tsuruta et al. ............. 711/149

FOREIGN PATENT DOCUMENTS

EP 0 549 218 A1 6/1993

OTHER PUBLICATIONS

Bechade, R. et al., "A 32B 66MHz 1.8W Microprocessor," *IEEE International Solid–State Circuits Conference*, New York, vol. 37, Feb. 1994, pp. 208–209, 340.

Gerosa, G. et al. "A 2.2W, 80 MHz Superscalar RISC Microprocessor," *IEEE Journal of Solid–State Circuits*, 29(12):140–1454, Dec. 1994.

* cited by examiner

*Primary Examiner*—David Nelms
*Assistant Examiner*—Thinh T Nguyen
(74) *Attorney, Agent, or Firm*—Lisa K. Jorgenson; Robert Iannucci; Seed IP Law Group PLLC

(57) ABSTRACT

An integrated cache memory circuit is provided comprising a tag RAM, a comparator and a data RAM. Each of the tag RAM and the date RAM have an array of memory cells and plural sense amplifiers. Each memory cell of the RAMs is connected via a respective bit line to one of the plural sense amplifiers. The sense amplifiers of the tag RAM have respective outputs coupled to a first input of the comparator. The comparator having a second input for address information and an output for selectively enabling data output from sense amplifiers of the data RAM. The memory cells of the tag RAM are arranged to have a higher current drive than the memory cells of the data RAM.

20 Claims, 3 Drawing Sheets

CACHE MEMORY

The present invention relates to the general field of cache memory circuits.

Cache memory circuits are well known in the art as memory circuitry which may enable optimal response to the needs of a high speed processor. Cache memories are usable as temporary storage of information, for example of information relatively recently used by the processor. Information in cache RAM may be stored based upon two principles, namely spatial locality and temporal locality. The principle of spatial locality is based upon the fact that when data is accessed at an address, there is an above average likelihood that the data which is next required will have an address close to that of the data which has just been accessed. By contrast, temporal locality is based upon the fact that there is an above average probability that data which has just been accessed will be accessed again shortly.

In one approach therefore, when an item of data is accessed, adjacent data is written to cache memory in anticipation of the need to access it, and in another, the item which is accessed is stored. A desirable approach is to do both.

There are many different cache configurations, ranging from direct-mapped cache memory to fully-associative cache memory.

Although the present invention is described in the context of a set-associative cache memory, is not envisaged that it be so limited, and the architecture described and the particular circuit details are equally applicable to other types of cache.

In a typical cache memory, there is provided a so-called "tag RAM" and a so-called "data RAM". The tag RAM stores information representative of an address in the memory of the computer, e.g. the main memory, and the data RAM stores the content of that address. Each entry in the tag RAM thus has an associated entry in the data RAM. In one type of cache, the tag memory stores the most significant bits of a memory address at a location in the tag RAM determined by the least significant bits of the memory address. Hence application of the least significant bits of the memory address to an address decoder causes the said location to be accessed, and thus the tag RAM outputs the stored most significant bits of the memory address. Comparison is then made between the output of the tag RAM, namely the most significant bits of the stored address and the most significant bits of the address being sought. When identity occurs between the output of the tag RAM and the address being sought, then there is said to be a hit in the tag RAM. A line or entry in the data RAM associated with the access from the address decoder is then output, by then consisting of the data stored at the memory address. If there is a hit between the address applied to the cache and the tag information stored, then the contents of the data memory are output from the cache. If there is no hit, (this situation is termed "a miss") then the contents of the data memory are not output.

According to the particular technique being used, a mechanism may exist for overwriting both the tag and data RAMs if no hit occurs.

Cache memories are desirably fast in response, since a processor responsive to data stored in the cache cannot complete its action until it has retrieved data from the cache. Equally, the system must be made aware as quickly as possible if the data which is sought is NOT in the cache. It is clearly a truism for many situations that an indication of whether or not data is stored in the cache should only be made available when it has reliably been determined.

Consideration of the operation of a cache memory having a tag RAM, a comparator and a data RAM shows that the critical timing path is that through the tag RAM and comparator. While the comparator itself needs to be fast in response, it cannot produce a result until it has received valid data at its inputs: one input is an address from the system itself and the other input is the result of access to the tag RAM, and sense amplifiers sensing the data in the tag RAM.

The person skilled in the art will be aware that sense amplifiers respond to differentials on bit lines or to potentials on bit lines to provide an output which corresponds to the information stored in memory cells. Sense amplifiers exist which are very sensitive to input differentials, but nevertheless a delay must be provided from the instant at which the memory cell is activated before such sense amplifiers are activated if a reliable result is to be achieved. The delay is determined by a number of factors, including the electrical length of the wordlines, and the current sourcing/sinking ability of the memory cells attached to the wordlines. Once a clock pulse is provided to activate the sense amplifier a further period elapses, due to the inherent delay of the sense amplifier, before the output of the sense amplifier will correspond to the memory cell contents.

Another problem in the prior art is that of complicated layouts of integrated cache memories. It would be desirable to have an architecture that enables single physically continuous wordlines to run through the tag and data RAMs.

It is accordingly one aim of the present invention to provide a cache memory circuit which at least partly overcomes the problems of the prior art.

According to the present invention there is provided an integrated cache memory circuit comprising a tag RAM, a comparator and a data RAM, each of said tag RAM and said data RAM having an array of memory cells and plural sense amplifiers, each memory cell of said RAMs being connectable via a respective bitline to one of said plural sense amplifiers, said sense amplifiers of said tag RAM having respective outputs coupled to a first input of said comparator, said comparator having a second input for address information, and an output for selectively enabling data output from sense amplifiers of said data RAM, wherein the memory cells of said tag RAM are arranged to have a higher current drive than the memory cells of said data RAM.

In one embodiment, the memory cells of said tag RAM and of said data RAM comprise transistors, and the transistors of said tag RAM cells have a greater electrical width than the transistors of said data RAM.

In another embodiment, the memory cells of said data RAM have a first drive potential and the memory cells of said tag RAM have a second drive potential, said first drive potential being higher than said second drive potential.

Preferably said data RAM and tag RAMs share common wordlines.

A preferred but non limiting embodiment of the invention will now be described with reference to the accompanying drawings in which.

Figure 1:
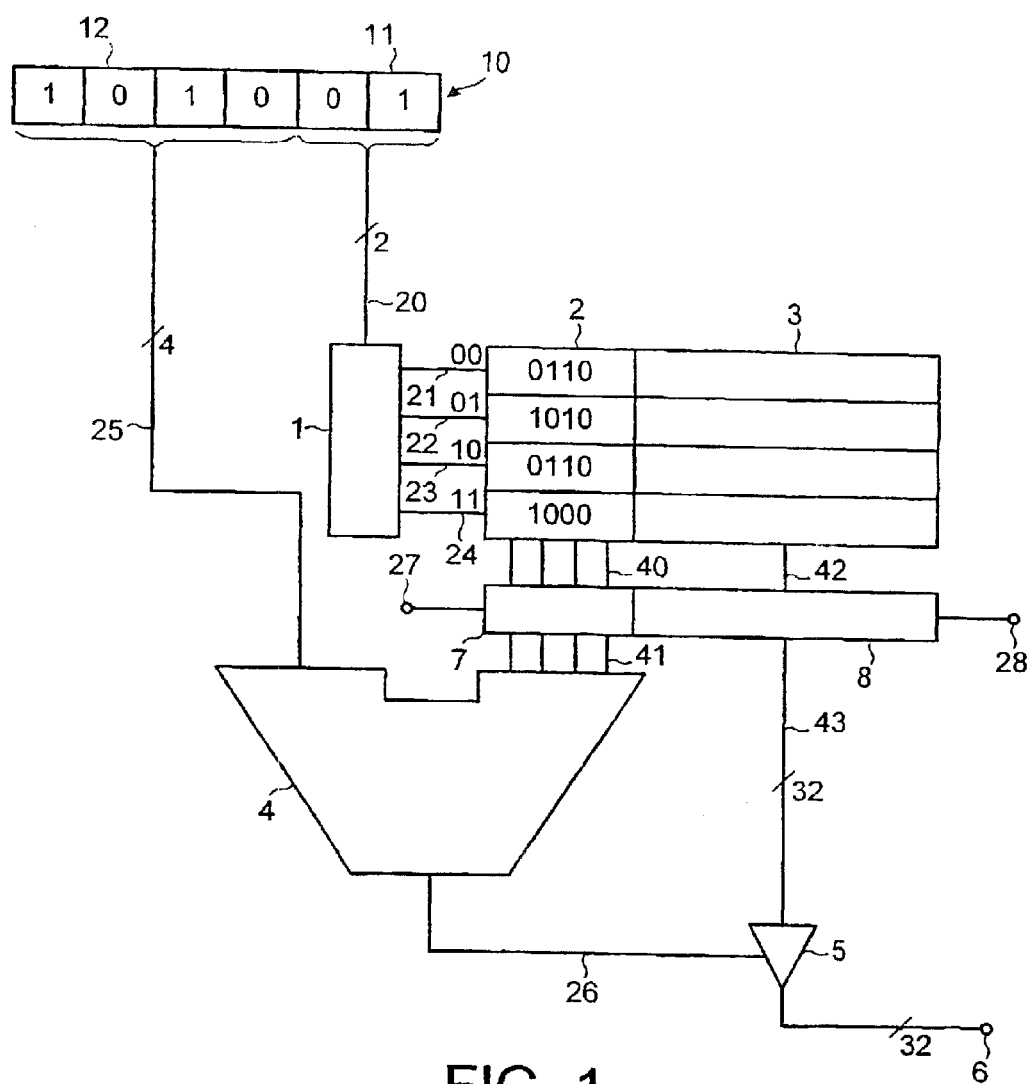
FIG. 1 shows a block schematic diagram of an embodiment of a cache memory in accordance with the present invention.

Referring first to FIG. 1, a cache memory device has an address decoder 1 having an input 20 and four outputs 21–24 addressing the four rows of a tag RAM 2, having respective addresses "00", "01", "10" and "11", and simultaneously addressing the four rows of a data RAM 3. The tag RAM 2 has four column lines 40 which are input to a first sense amplifier block 7, the sense amplifier block 7 having four outputs 41 providing the first inputs to a comparator 4. The second input to the comparator 4 is provided by a four way bus 25. The data RAM 3 has 32 column lines 42 fed to a second sense amplifier block 8 which has 32 output lines 33 which are fed to a gating circuit 5 controlled by the output 26 of the comparator 4. The first sense amplifier block 7 has a clock input 27 and the second amplifier block 8 has a clock input 28.

Reference numeral 10 indicates a six bit address which consists of two least significant bits 11 which provide the input 20 to the address decoder 1 and four most significant bits 12 which provide the second input 25 to the comparator 4.

In this simplified example, the least significant bits 11 are "01" and the most significant bits 12 are "1010".

In use the least significant bits 11 are supplied over input line 20 to the address decoder 1 and the address decoder provides an output on line 22, the second line of the cache which corresponds to the address "10". Further inspection of FIG. 1 shows the contents of the second line of the tag RAM is "1010" which in this example corresponds to the most significant bits 12 of the address 10.

As known to those skilled in the art, the memory cells of the second line of the tag RAM are connected by the output of the address decoder to the bit lines 40 and after a delay caused by propagation along the bit lines the inputs to the first sense amplifier block 7 are in the state "1010". At a predetermined time the clock input 27 to the first sense amplifier block 7 changes state and shortly thereafter the sense amplifiers of the first sense amplifier block 7 assume the output state "1010".

This state change will typically be latched at the output of each of the sense amplifiers.

The input "1010" is applied to the first input 41 of the comparator 4 and the most significant bits 12 (also "1010") are applied to the second input 25 of the comparator 4. After a period corresponding to the propagation delay of the comparator 4, the output line 26 will go to a logic 1 state.

Activation of the word line 22 to the second row of the tag RAM also activates the second row of the data RAM 3. In a similar fashion to the tag RAM, this causes the bit lines 42 to acquire a state corresponding to the data stored in the second row of the data RAM 3, this state being applied to the second sense amplifier block 8 and, upon a clock transition being applied to the corresponding clock terminal 28, the output lines 43 to the gating circuit 5 correspond to the contents of the second row of the data RAM.

At the time the comparator output line 26 goes to logic 1 the gating circuit 5 passes the logic state at its input to the output bus 6.

From the above discussion it will be seen that if the two sense amplifier blocks were clocked at the same time to provide a valid output at the same time there will be an additional delay after the clock before the gate 5 can provide an output caused by the propagation delay of the comparator 4 in the "hit/miss" path.

In accordance with the invention therefore, the cells in the tag RAM 2 are arranged to have a higher current capability than those in the data RAM 3. As a result, the sense amplifiers 7 can be activated by a pulse at input 27 earlier than the sense amplifiers 8. If the cells in the tag RAM are sufficiently higher in current capacity than those of the data RAM, the sense amplifiers 7 can be clocked early enough for a valid output to be obtained from them, and that output to pass through the comparator 4 to arrive at the output 26 of the comparator at the time a valid output is achieved from the sense amplifiers 8.

In the cache memory of the invention, it is therefore possible to use a fast tag RAM, having so-called fat transistors, as these fall within the critical path, while the transistors of the data RAM may be relatively thin. In an alternative, the drive voltage to the cells of the tag RAM may be higher than that of the data RAM, so that a bit-line separation for the tag RAM takes place more rapidly than on the data RAM. In yet another set up, both techniques may be used.

Figure 2:
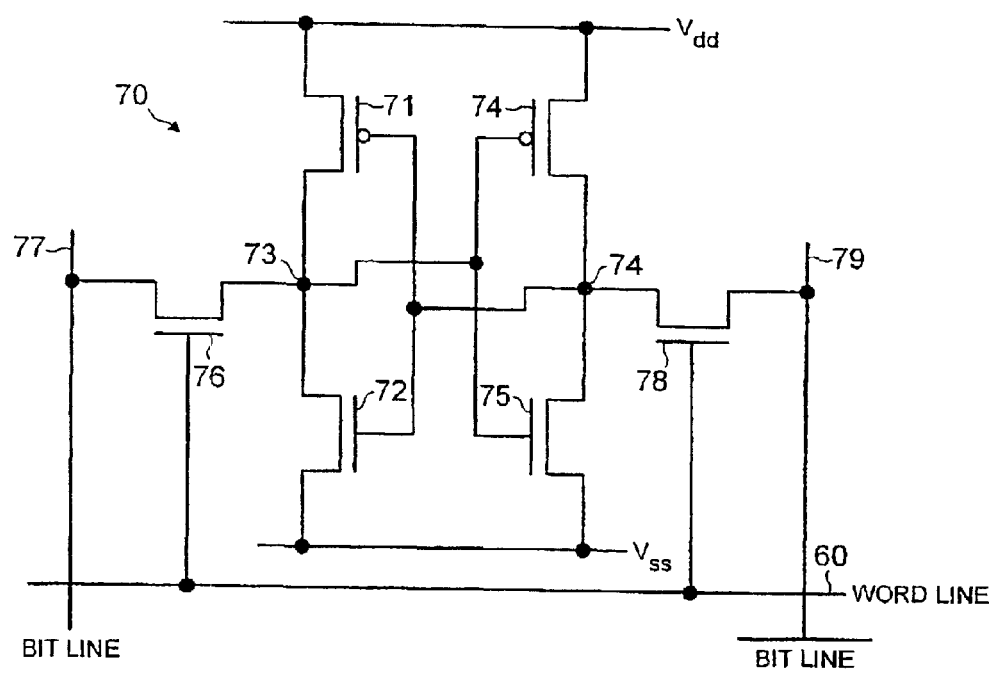
FIG. 2 shows a memory cell for use in the memory of FIG. 1.

Referring now to FIG. 2, an exemplary memory cell 70 will now be described. It will be understood by those skilled in the art that many other configurations of memory cell may be used. The memory cell 70 comprises two cross-coupled CMOS inverters connected between a positive supply $V_{dd}$ and a negative supply $V_{ss}$. The first CMOS inverter consists of a p MOSFET 71 having its main current path connected in series with an n MOSFET 72, the common connection between the two transistors forming a first node 73. The second CMOS inverter likewise consists of a p MOSFET 74 having its main current path connected in series with an n MOSFET 75, the common connection between the two transistors forming a second node 74. The first node 73 is connected to the gates of the two transistors of the second inverter and the second node 74 is connected to the gates of the two transistors of the first inverter. The first node 73 is connected via a first N-type path transistor 76 to a first bit line 77 and the second node 74 is connected via a second N-type path transistor 78 to a second bit line 79. The gates of the N-type path transistors 76 and 78 are connected to a word line 60.

As discussed above, the memory cell 70 of the tag RAM may have transistors 71–75 of larger size than the corresponding devices of the cells of the data RAM. Alternatively, or additionally, the supply voltage Vdd may be higher in the tag RAM than in the data RAM.

It would of course be possible to use fat transistors throughout, but this would be disadvantageous because of the space occupied on the die.

Figure 3:
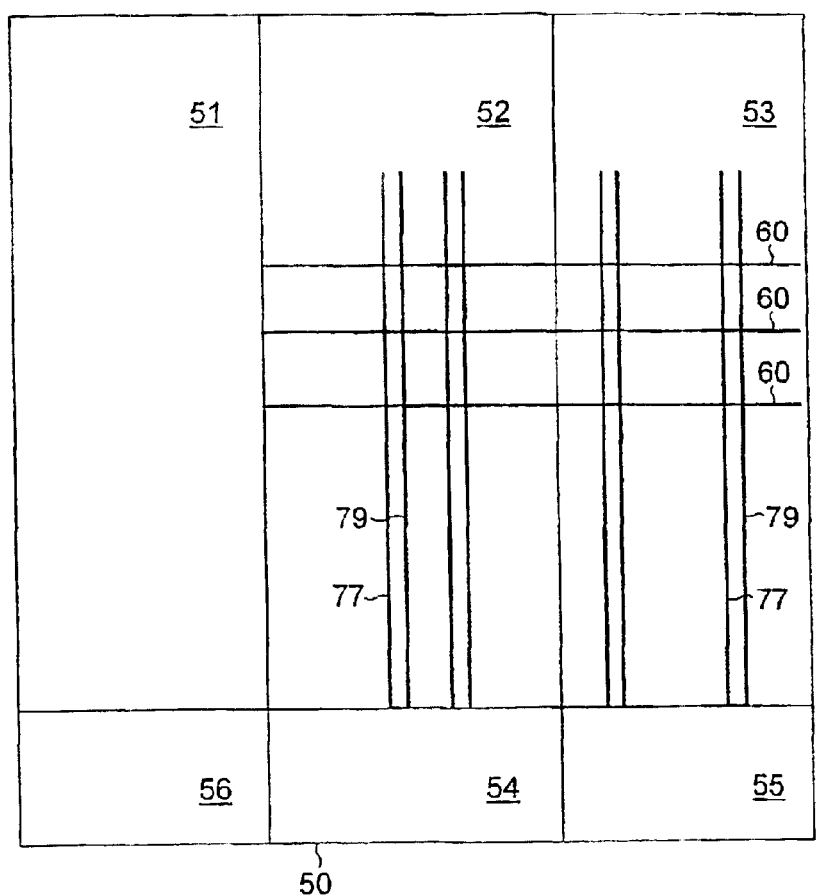
FIG. 3 shows a floorplan of an integrated cache memory in accordance with the present invention.

Referring now to FIG. 3, a floorplan of the cache memory of FIG. 1 is shown. The memory 50 comprises 6 areas as follows:

The first area 51 is provided for the word line decoders and drivers.

The second and third areas 52, 53 which are alongside the first area 51 are a pair of memory arrays having bit lines 60 extending through both of the arrays as column lines. The first array 52 forms a data RAM of the cache and has relatively thin cells. By thin cell is meant possessing drive transistors dimensioned to have a small current capability, e.g. relatively wide short channels. The second array 53 which lies beyond the first array 52 forms the tag RAM and has relatively fat memory cells. Fat cells provide a substantially higher drive capability to the bit lines of the tag RAM than is provided by the thin cells of the data RAM. The extra drive capability means that the bit lines in the tag RAM reach a valid potential level much more quickly than those of the data RAM.

As described above the array 53 may also or instead have higher drive voltages: however this may cause problems as memories tend to be required to operate with only standard supply potentials.

The fourth area 54, which is associated with the bit lines 61 of the tag RAM, is an area for sense amplifiers for the tag RAM, which sense amplifiers are formed of thin fast transistors. The fourth area 54 also provides the location for the comparator.

The fifth area 55 is the location for the sense amplifiers for the bit lines 62 of the data RAM. The fifth area 55 also provides the location for the gating circuit and output driver circuitry of the cache memory.

The sixth and final area 56 is provided for control logic of the cache memory.

It will be seen that the floor plan of the cache memory 50 is very simple.

The particular floor plan shown in FIG. 2 is exemplary; it would be possible for example to dispose the word line decoder and driver area 51 between the RAM areas 52 and 53.

Clock paths for the sense amplifiers of each array may be provided by use of dummy bit lines, as known to those skilled in the art. Alternatively, the appearance of a valid output at the comparator could be used to clock the data RAM sense amplifiers, or the clock for those sense amplifiers could be derived from a simple delay to the clock pulse 27 applied to the sense amplifiers of the tag RAM.

What is claimed is:

1. An integrated cache memory circuit comprising a tag RAM, a comparator and a data RAM, each of said tag RAM and said data RAM having an array of memory cells and plural sense amplifiers, each memory cell of said RAMs being connectable via a respective bitline to one of said plural sense amplifiers, said sense amplifiers of said tag RAM having respective outputs coupled to a first input of said comparator, said comparator having a second input for address information, and an output for selectively enabling data output from sense amplifiers of said data RAM, wherein the memory cells of said tag RAM are arranged to have a higher current drive than the memory cells of said data RAM.

2. The memory circuit of claim 1 wherein said memory cells of said tag RAM and of said data RAM comprise transistors, and the transistors of said tag RAM cells have a greater electrical width than the transistors of said data RAM.

3. The memory circuit of claim 1 wherein said memory cells of said data RAM have a first drive potential and the memory cells of said tag RAM have a second drive potential, said first drive potential being higher than said second drive potential.

4. The memory circuit of claim 2 wherein said memory cells of said data RAM have a first drive potential and the memory cells of said tag RAM have a second drive potential, said first drive potential being higher than said second drive potential.

5. The memory circuit of claim 1 wherein said data RAM and tag RAMs share common wordlines.

6. An integrated cache memory circuit comprising:
   a tag RAM having an array of memory cells and plural sense amplifiers connected to the memory cells;
   a data RAM having an array of memory cells and plural sense amplifiers connected to the memory cells of the data RAM; and
   a comparator having a first input coupled to respective outputs of the tag RAM, and an output for selectively enabling data output from sense amplifiers of the data RAM, wherein the memory cells of the tag RAM have a higher current drive than the memory cells of the data RAM.

7. The memory circuit of claim 6 wherein the memory cells of the tag RAM and of the data RAM comprise transistors, and the transistors of the tag RAM cells have a greater electrical width than the transistors of the data RAM.

8. The memory circuit of claim 7 wherein the memory cells of the data RAM have a first drive potential and the memory cells of the tag RAM have a second drive potential, the first drive potential being higher than the second drive potential.

9. The memory circuit of claim 6 wherein the memory cells of the data RAM have a first drive potential and the memory cells of the tag RAM have a second drive potential, the first drive potential being higher than the second drive potential.

10. The memory circuit of claim 6 wherein the data RAM and tag RAMs share common wordlines.

11. The memory circuit of claim 6, further comprising an address decoder coupled to the memory cells of the tag RAM and the memory cells of the data RAM.

12. An integrated cache memory circuit comprising:
   a tag RAM having an array of memory cells and plural sense amplifiers connected to the memory cells, the array of memory cells including a plurality of word lines connected respectively to sets of the memory cells;
   a data RAM having an array of memory cells and plural sense amplifiers connected to the memory cells of the data RAM, the array of memory cells of the data RAM including a plurality of word lines connected respectively to sets of the memory cells of the tag RAM; and
   a comparator having a first input coupled to respective outputs of the tag RAM, and an output for selectively enabling data output from sense amplifiers of the data RAM, wherein the word lines of the tag RAM and data RAM are shared by the tag RAM and data RAM.

13. The memory circuit of claim 12 wherein the memory cells of the tag RAM and of the data RAM comprise transistors, and the transistors of the tag RAM cells have a greater electrical width than the transistors of the data RAM.

14. The memory circuit of claim 13 wherein the memory cells of the data RAM have a first drive potential and the memory cells of the tag RAM have a second drive potential, the first drive potential being higher than the second drive potential.

15. The memory circuit of claim 12 wherein the memory cells of the data RAM have a first drive potential and the memory cells of the tag RAM have a second drive potential, the first drive potential being higher than the second drive potential.

16. The memory circuit of claim 12, further comprising an address decoder coupled to the word lines of the tag RAM and the word lines of the data RAM.

17. An integrated cache memory circuit comprising:
   a tag RAM having an array of memory cells and plural sense amplifiers connected to the memory cells;
   a data RAM having an array of memory cells and plural sense amplifiers connected to the memory cells of the data RAM;
   a comparator having a first input coupled to respective outputs of the tag RAM and a second input for receiving address information, and an output for selectively enabling data output from sense amplifiers of the data RAM; and
   wherein the memory cells of the tag RAM are arranged to have a higher drive voltage than the memory cells of the data RAM so that a bit line separation for the tag RAM takes place more rapidly than on the data RAM.

18. The memory circuit of claim 17 wherein the memory cells of the tag RAM and of the data RAM comprise transistors, and the transistors of the tag RAM cells have a greater electrical width than the transistors of the data RAM.

19. The memory circuit of claim 17 wherein the data RAM and tag RAMs share common word lines.

20. The memory circuit of claim 17, further comprising an address decoder coupled to the memory cells of the tag RAM and the memory cells of the data RAM.

* * * * *

UNITED STATES PATENT AND TRADEMARK OFFICE
CERTIFICATE OF CORRECTION

| | | |
|---|---|---|
| PATENT NO. | : 6,813,179 B2 | Page 1 of 1 |
| APPLICATION NO. | : 10/130174 | |
| DATED | : November 2, 2004 | |
| INVENTOR(S) | : William Bryan Barnes | |

It is certified that error appears in the above-identified patent and that said Letters Patent is hereby corrected as shown below:

<u>Title page,</u>
Item [86], "Nov. 17, 2002" should read as --Dec, 17, 2002--.
Item [30], Under Foreign Priority Data:
    "GB 00222323" should read --GB 0022323--.

Signed and Sealed this

Twenty-fourth Day of April, 2007

JON W. DUDAS
*Director of the United States Patent and Trademark Office*